United States Patent
Ahn et al.

(10) Patent No.: US 7,173,082 B2
(45) Date of Patent: Feb. 6, 2007

(54) ACRYLIC IMPACT MODIFIER PREPARED BY MULTI-STAGE POLYMERIZATION AND METHOD FOR PREPARING THE SAME

(75) Inventors: Jeong-Heon Ahn, Suncheon (KR); Chang-Sun Han, Daejeon (KR); Yong-Hun Lee, Yeosu (KR); Seon-Hee Han, Gwangju (KR); Kwang-Jin Lee, Busan (KR); Hyung-Jun Son, Daegu (KR)

(73) Assignee: LG Chem, Ltd. (KR)

( * ) Notice: Subject to any disclaimer, the term of this patent is extended or adjusted under 35 U.S.C. 154(b) by 177 days.

(21) Appl. No.: 10/472,593

(22) PCT Filed: Jan. 14, 2003

(86) PCT No.: PCT/KR03/00075

§ 371 (c)(1),
(2), (4) Date: Sep. 22, 2003

(87) PCT Pub. No.: WO03/062292

PCT Pub. Date: Jul. 31, 2003

(65) Prior Publication Data

US 2005/0119393 A1 Jun. 2, 2005

(30) Foreign Application Priority Data

Jan. 25, 2002 (KR) .................. 10-2002-0004564

(51) Int. Cl.
- *C08F 285/00* (2006.01)
- *C08F 265/06* (2006.01)
- *C08F 2/16* (2006.01)
- *C08L 51/04* (2006.01)
- *C08L 27/06* (2006.01)

(52) U.S. Cl. .................. 524/458; 523/201; 526/201; 525/902

(58) Field of Classification Search ............... 524/458; 526/201; 523/201; 525/902
See application file for complete search history.

(56) References Cited

U.S. PATENT DOCUMENTS

| | | | |
|---|---|---|---|
| 4,520,166 A | 5/1985 | Kamada et al. | 525/85 |
| 4,564,653 A | 1/1986 | Kamada et al. | 525/67 |
| 4,670,509 A | 6/1987 | Aoyama et al. | 525/85 |
| 4,966,942 A * | 10/1990 | Sasaki et al. | 525/67 |
| 5,194,498 A | 3/1993 | Stevenson et al. | 525/81 |
| 5,382,625 A | 1/1995 | Lindner et al. | 525/81 |
| 5,612,413 A | 3/1997 | Rozkuszka et al. | 525/85 |
| 5,773,520 A * | 6/1998 | Bertelo et al. | 525/309 |

FOREIGN PATENT DOCUMENTS

| | | |
|---|---|---|
| EP | 0 527 605 A1 | 2/1993 |
| EP | 0 921 138 A1 | 6/1999 |
| EP | 1 106 649 A1 | 6/2001 |
| EP | 1 167 407 A1 | 1/2002 |
| JP | 59033342 A * | 2/1984 |
| JP | 10324787 A * | 12/1998 |
| JP | 11-147991 | 2/1999 |
| JP | 11209545 A | 8/1999 |
| KR | 00160333 B1 | 8/1998 |
| WO | WO 01/72896 A1 | 10/2001 |

* cited by examiner

*Primary Examiner*—Kelechi C. Egwim
(74) *Attorney, Agent, or Firm*—Cantor Colburn LLP

(57) ABSTRACT

The invention relates to an acrylic impact modifier having a core-shell structure that provides an acrylic impact modifier composition comprising (a) a rubber core containing an alkyl acrylate polymer comprising at least two layers having different cross-linking densities, and (b) a shell containing an alkyl methacrylate polymer; to a process for the preparation of the acrylic impact modifier; and to a poly(vinyl chloride) composition comprising it. The acrylic impact modifier imparting excellent impact resistance was invented by employing multi-stage polymerization and at the same time by controlling the swelling index of rubber particles by changing the degree of cross-linking from stage to stage. And the poly(vinyl chloride) comprising the impact modifier of the present invention has good weatherability as well as excellent impact strength.

10 Claims, No Drawings

ACRYLIC IMPACT MODIFIER PREPARED BY MULTI-STAGE POLYMERIZATION AND METHOD FOR PREPARING THE SAME

BACKGROUND OF THE INVENTION (a) Field of the Invention

The present invention relates to an acrylic impact modifier having a core-shell structure, and in particular, it relates to an acrylic impact modifier prepared by a polymerization process of at least three stages, a process for the preparation thereof, and a poly(vinyl chloride) (PVC) containing it that has excellent impact resistance.

(b) Description of the Related Art

Methyl methacrylate butadiene styrenic (MBS) resins, chlorinated polyethylenic (CPE) resins, acrylic resins, etc. are used as impact modifiers to improve the impact resistance of poly(vinyl chloride). Of them, the acrylic resins have good weatherability and are thus widely used as impact modifiers for outdoor plastic products that are exposed to sunlight for a long time. As an example, for products such as window frames that require impact resistance and weatherability at the same time, polymers having a core-shell structure wherein methacrylic polymers having good compatibility with poly(vinyl chloride) are grafted onto a rubbery core consisting of alkyl acrylates, are mostly used.

As factors determining the physical properties of acrylic impact modifiers having a core-shell structure, the rubber content of impact modifiers, the size of rubber particles, the distance between rubber particles, the swelling index for solvent, the bonding degree between matrix and impact modifier particles dispersed by milling, and so forth, are important. In particular, the bonding between the matrix and the impact modifier is determined by the grafting efficiency of the shell onto the impact modifier rubber core.

As a process for preparing impact modifiers to improve the impact resistance of poly(vinyl chloride), there is conventional emulsion polymerization, which includes the following two methods. The first method, as shown in U.S. Pat. No. 5,612,413, is multi-stage emulsion polymerization carried out firstly by polymerizing a seed, then by charging core component monomers thereto over two to four stages to grow a rubber particle, and finally by wrapping the core surface by the addition of shell component monomers to complete a core-shell structure. The second method is, as shown in European Patent Publication 0 527 605 A1, a microagglomeration method wherein a latex having a core-shell structure of 100 nm or less is polymerized, it is allowed to grow to a desired particle size by agglomeration, and a final core-shell structure is formed by the formation of an encapsulation shell.

The multi-stage emulsion polymerization process, as shown in said U.S. Pat. No. 5,612,413, can be divided into core polymerization and shell polymerization. The core polymerization uses alkyl acrylate monomers. The alkyl acrylates exhibit the impact resistance of a rubber component due to their low glass transition temperature and the fact that double bonds in molecules do not remain after polymerization, and accordingly, they can prevent the decomposition of polymers from UV and the decrease of impact strength derived therefrom. In addition to alkyl acrylates, compounds having at least two non-conjugated carbon-carbon double bonds are used as a cross-linker. The cross-linkers of rubber not only maintain the stability of latex, but they also help the structure of the impact modifier rubber to retain its shape within the matrix during the milling process. If cross-linking of the rubber is insufficient, the stability of the latex cannot be secured and uniform dispersion does not occur, thereby causing a decrease of impact resistance and weatherability. Also, if the degree of cross-linking of rubber is too high, impact strength decreases.

Shell polymerization is conventionally conducted by graft polymerizing onto the surface of a core of the methyl methacrylate monomers, which have excellent compatibility with poly(vinyl chloride), alone or together with a small amount of monomers having two or more functional groups. In particular, the methyl methacrylates not only have excellent compatibility with the matrix, but they also have a comparatively high glass transition temperature, and accordingly they contribute to the improvement of the coagulation properties of the latex. To increase the dispersability of impact modifiers in the interior of the matrix, acrylonitrile monomers may be added in a small amount during the shell polymerization.

SUMMARY OF THE INVENTION

The present invention has been made to provide an acrylic impact modifier capable of improving impact resistance when contained in poly(vinyl chloride) in consideration of the problems of the foregoing prior arts.

It is an another object of the invention to provide an acrylic impact modifier capable of maximizing impact strength of poly(vinyl chloride) by controlling the swelling index of rubber particles, a process for the preparation thereof, and a poly(vinyl chloride) comprising it.

To accomplish the foregoing objects, the invention provides an acrylic impact modifier composition for poly(vinyl chloride), comprising (a) a rubber core containing alkyl acrylate polymers comprising at least two layers having different cross-linking densities; and (b) a shell containing alkyl methacrylate polymers.

In addition, the invention provides a process for preparing an acrylic impact modifier comprising the stages of (a) preparing a latex seed by a cross-linking reaction of a mixture comprising (i) an alkyl acrylate monomer having 2 to 8 carbon atoms in the alkyl group, (ii) a cross-linker, (iii) a polymerization initiator, (iv) an emulsifier, and (v) water;

(b) preparing a latex rubber core in which at least one core layer is formed on said seed by conducting polymerization at least once by continuously charging a pre-emulsion mixture comprising (i) an alkyl acrylate having 2 to 8 carbon atoms in the alkyl group, (ii) a cross-linker, (iii) an emulsifier, and (iv) water together with (v) a polymerization initiator to the latex seed of stage (a); and (c) forming a shell by conducting polymerization by charging a pre-emulsion mixture comprising (i) an alkyl methacrylate having 1 to 4 carbon atoms in the alkyl group, (ii) an emulsifier, and (iii) water together with (iv) a polymerization initiator to the latex rubber core of stage (b), thereby preparing the acrylic impact modifier latex, wherein the amount of the cross-linker of stage (a) (ii) and the amount of the cross-linker of stage (b) (ii) are different, and they are selected from within a range of 0.1 to 5.0 parts by weight based on 100 parts by weight of the total monomers present in the acrylic impact modifier composition.

Further, the invention provides a poly(vinyl chloride) composition comprising (a) 80 to 99 parts by weight of poly(vinyl chloride); and (b) 1 to 20 parts by weight of an acrylic impact modifier comprising (i) a rubber core containing alkyl acrylate polymers comprising at least two layers having different cross-linking densities; and (b) a shell containing alkyl methacrylate polymers.

DETAILED DESCRIPTION OF THE PREFERRED EMBODIMENTS

The present invention is hereinafter described in detail.

The invention intends to control the swelling index of an acrylic impact modifier rubber particle, thereby maximizing the impact strength of poly(vinyl chloride) comprising it. For this object, the impact modifier is prepared with a different content of cross-linkers charged thereto in each stage of rubber polymerization.

The invention provides an acrylic impact modifier with impact strength that is improved by polymerizing rubber through at least three stages in which the cross-linking density is changed in each stage, a process for the preparation thereof, and a poly(vinyl chloride) comprising it.

A preferred swelling index of the final particle of the acrylic impact modifier of the invention is 2.0 to 9.0.

The effects of the swelling index of the impact modifier of the invention on impact resistance are explained in the following.

The term "swelling index" refers to the free volume of the interior of a polymer, as a parameter for indicating the swelling degree of gel by solvent. The swelling index of the impact modifiers decreases as the cross-linking density increases, and it increases as the cross-linking density decreases. The cross-linking density varies according to the amount of the cross-linkers charged thereto when rubber is prepared, and the impact resistance of the impact modifiers is improved as the swelling index is increased by the use of a small amount of the cross-linkers. However, if the content of the cross-linker is below a certain amount, the stability of the latex during polymerization decreases. Therefore, there exists a minimum value for the content of cross-linkers, and thus there is a limit in controlling the swelling index.

The acrylic impact modifier of the invention is prepared by polymerizing a seed, then by charging core component monomers to at least one layer, preferably through 1 to 4 stages, to grow rubber particles, and finally by charging shell component monomers to wrap the surface of the core to thereby produce a latex having a particle size of 160 nm to 250 nm. However, in order to control the swelling index of the impact modifier, the amount of the cross-linkers charged during each rubber polymerization, including the preparation of the seed, is adjusted differently.

It is preferred that the acrylic impact modifier of the invention comprises 70 to 95 parts by weight of the core component, and 5 to 30 parts by weight of the shell component, based on the total monomers. In other words, the seed and core of the acrylic impact modifier of the invention should include the rubber component monomers at 70 to 95 parts by weight of the total charged monomers. If they are present at less than 70 parts by weight, the impact resistance decreases due to a small content of rubber, and if they exceed 95 parts by weight, the shell component does not completely wrap the core and thus the dispersion of rubber does not occur, thereby decreasing impact resistance.

More particularly, if the rubber core consists of a seed and two core layers, it is preferred that the rubber particles of said rubber core comprise, on the basis of the weight of the total acrylic impact modifier composition, i) a seed of 4.9 to 14.9 parts by weight of an alkyl acrylate having 2 to 8 carbon atoms in the alkyl group and 0.1 to 5.0 parts by weight of a cross-linker; ii) a first core layer of 27.5 to 45.0 parts by weight of an alkyl acrylate having 2 to 8 carbon atoms in the alkyl group and 0.1 to 5.0 parts by weight of a cross-linker; and iii) a second core layer of 27.5 to 45.0 parts by weight of an alkyl acrylate having 2 to 8 carbon atoms in the alkyl group and 0.1 to 5.0 parts by weight of a cross-linker.

As the alkyl acrylates of said (i) to (iii), one or more monomers selected from the group consisting of, ethyl acrylate, propyl acrylate, isopropyl acrylate, butyl acrylate, hexyl acrylate, octyl acrylate, and 2-ethyl hexyl acrylate, or a homopolymer or copolymer of these monomers can be used, and butyl acrylate, 2-ethyl hexyl acrylate, ethyl acrylate, and a mixture thereof are more preferable.

As the cross-linkers of said (i) to (iii), one or more monomers selected from the group consisting of 1,3-butanediol diacrylate, 1,3-butanediol dimethacrylate, 1,4-butanediol diacrylate, 1,4-butanediol dimethacrylate, allyl acrylate, allyl methacrylate, trimethylolpropane triacrylate, tetraethyleneglycol diacrylate, tetraethyleneglycol dimethacrylate, and divinylbenzene can be used. More preferably, 1,3-butanediol diacrylate, 1,3-butanediol dimethacrylate, allyl acrylate, allyl methacrylate, and a mixture thereof are used. It is preferable to use said cross-linkers in an amount of 0.1 to 5.0 parts by weight based on 100 parts by weight of the total monomers at each core layer. If the amount of cross-linker is less than 0.1 parts by weight of the total monomers, the matrix and spherical particles are apt to be modified during milling, and if they are used more than 5.0 parts by weight, the core exhibits brittle characteristics and causes impact resistance to decrease.

Also, in said impact modifier, the shell comprises

ⓐ monomer comprising alkyl methacrylates having 1 to 4 carbon atoms in the alkyl group in an amount of 5 to 30 parts by weight;

ⓑ if necessary, an auxiliary monomer such as ethyl acrylate, methyl acrylate, or butyl acrylate may be used to control the glass transition temperature of the shell component; and ⓒ if necessary, an auxiliary monomer having a nitrile component such as acrylonitrile and methacrylonitrile may be used to increase the compatibility with the matrix.

The auxiliary monomers of said ⓑ and ⓒ that may be used are selected from the group of monomers mentioned above, and it is preferable to mix and use them at within 0.1 to 10% by weight based on 100% by weight of the total shell monomers.

The acrylic impact modifier of the invention is obtained by coagulating latex with electrolyte, or organic or inorganic acid, and then by filtering and drying it. As the electrolyte, calcium chloride, magnesium sulfate, etc. can be used.

The process for the preparation of the acrylic impact modifier of the invention is further clarified from the following embodiment. This embodiment focuses on the polymerization process of 4 stages and the coagulation process, and the content of each component refers to the amount charged in each stage. Cross-linkers charged to each core layer (a seed layer, a first core layer, and a second core layer) are different from one another, and components other than the cross-linkers are chosen within the following content ranges.

1) Preparation of Seed

A blend mixture comprising:

alkyl acrylate having $C_2$–$C_8$ in the alkyl group 97.0 to 99.9 parts by weight (pbw);

| | |
|---|---|
| cross-linker | 0.1 to 3.0 pbw; |
| polymerization initiator | 0.1 to 3.0 pbw; |
| emulsifier | 0.1 to 4.0 pbw; and |
| deionized water | 1000 pbw | is cross-linked and reacted at a temperature of 60 to 80° C. to prepare a seed (layer).

2) Preparation of First Core Layer

A blend mixture comprising:

| | |
|---|---|
| alkyl acrylate having $C_2$–$C_8$ in the alkyl group | 97.0 to 99.9 pbw; |
| cross-linker | 0.1 to 3.0 pbw; |
| emulsifier | 0.1 to 4.0 pbw; and |
| deionized water | 80 pbw | is prepared in a state of pre-emulsion, and then polymerization is conducted by continuously charging the thus-obtained emulsion solution to the seed prepared in stage 1), and at the same time, by charging 0.1 to 3.0 pbw of polymerization initiator to prepare a first core layer.

3) Preparation of Second Core Layer

A blend mixture comprising:

| | |
|---|---|
| alkyl acrylate having $C_2$–$C_8$ in the alkyl group | 97.0 to 99.9 pbw; |
| cross-linker | 0.1 to 3.0 pbw; |
| emulsifier | 0.1 to 4.0 pbw; and |
| deionized water | 80 pbw | is prepared in a state of pre-emulsion, and then polymerization is conducted by continuously charging the obtained emulsion solution to the second polymerization product prepared in stage 2), and at the same time, by charging 0.1 to 3.0 pbw of polymerization initiator, thereby forming a second core layer to prepare a core polymer as a tertiary polymerization product.

4) Preparation of Shell

A blend mixture comprising, on the basis of the weight of the monomers constituting the shell:

| | |
|---|---|
| alkyl methacrylate having $C_1$–$C_4$ in the alkyl group | 90 to 100 pbw; |
| alkyl acrylate selected from the group consisting of ethyl acrylate, methyl acrylate and butyl acrylate | 10 pbw or less; |
| emulsifier | 0.1 to 4.0 pbw; and |
| deionized water | 150 pbw | is prepared in a state of pre-emulsion, and then polymerization is conducted by continuously charging the obtained emulsion solution to the tertiary polymerization product prepared in stage 3), and at the same time, by charging 0.1 to 3.0 pbw of polymerization initiator to prepare a shell.

As the polymerization initiator used in the preparation of the above seed, core rubber, and shell, any compounds capable of causing a cross-linking reaction can be used. Particularly, ammonium persulfate, potassium persulfate, benzoyl peroxide, azo bis butyro nitrile, butyl hydroperoxide, cumene hydroperoxide, and so on can be used, and of them, it is preferable to use potassium persulfate or butyl hydroperoxide which are water-soluble, or a polymerization initiator that causes reaction through oxidation-reduction.

As the emulsifier used in the preparation of the above seed, core rubber, and shell, ionic or non-ionic emulsifiers such as unsaturated fatty acid potassium salt, oleic acid potassium salt, sodium lauryl sulfate (SLS), or sodium dodecyl benzene sulfonate (SDBS) can be used.

The impact modifier of the invention is finally coagulated by charging deionized water to the latex prepared above, thereby lowering the solid contents to 10% by weight, and then by charging 10% by weight of calcium chloride solution thereto. The mixture is aged by raising the temperature to 90° C., then it is cooled, washed with deionized water, and filtered to obtain an impact modifier.

The invention is further explained in more detail with reference to the following Examples and Comparative Examples. However, the Examples should be understood to only illustrate the present invention, and the invention should not be construed as being limited to these Examples.

EXAMPLES

Example 1

1) First Stage Reaction (Seed Polymerization Stage)

339.8 g of deionized water was charged into a reactor and heated to 70° C. When the temperature of the deionized water reached 70° C., 49.85 g of butyl acrylate, 0.05 g of allyl methacrylate, 0.10 g of 1,3-butanediol dimethacrylate, and 16.59 g of stearic acid potassium salt (8% by weight solution) were charged thereto at the same time. A seed was polymerized by charging 26.77 g of potassium persulfate (1% by weight) thereto while keeping the temperature in the reactor at 70° C. The particle size of the polymerized latex was determined to be 85 nm by use of a NICOMP, which is a laser light scattering apparatus.

2) Second Stage Reaction (Polymerization Stage of First Core Layer)

This stage is to polymerize a first core layer. 104.2 g of deionized water, 224.48 g of butyl acrylate, 0.175 g of allyl methacrylate, 0.35 g of 1,3-butanediol dimethacrylate, and 37.34 g of stearic acid potassium salt (8% by weight solution) were blended to produce a pre-emulsion. After the stabilized pre-emulsion was produced, it was continuously charged to the seed latex produced in the first stage reaction at a constant flow rate for one and a half hours. At the same time, 74.67 g of potassium persulfate (1% by weight) were continuously charged thereto for one and a half hours, thereby proceeding with polymerization.

3) Third Stage Reaction (Polymerization Stage of Second Core Layer)

This stage is to polymerize a second core layer, and it was performed similarly to the above second stage reaction. 104.2 g of deionized water, 224.18 g of butyl acrylate, 0.275 g of allyl methacrylate, 0.55 g of 1,3-butanediol dimethacrylate, and 37.34 g of stearic acid potassium salt (8% by weight solution) were blended to produce a pre-emulsion. After the stabilized pre-emulsion was produced, it was continuously charged to the latex produced in the second stage reaction at a constant flow rate for one and a half hours. At the same time, 74.67 g of potassium persulfate (1% by weight solution) were continuously charged thereto for one and a half hours, thereby proceeding with polymerization. It was then aged for one hour at 70° C., which is the reaction temperature, to complete the core portion.

4) Fourth Stage Reaction (Polymerization Stage of Shell)

This stage is to polymerize a shell portion onto the core portion produced in the third stage. First, a pre-emulsion of 197.5 g of deionized water, 117.75 g of methyl methacrylate, 9.25 g of ethyl acrylate, and 13.8 g of stearic acid potassium salt (8% by weight solution) was produced. The pre-emulsion was continuously charged to the latex of the above third stage, together with 69.2 g of potassium sulfate (1% by weight solution) for one hour, thereby performing the reaction of the shell portion. Likewise, while the temperature in the reactor was maintained at 70° C., it was aged for one hour to complete the polymerization. The final size of the polymerized particles was 190 nm.

As the cross-linkers in the following Examples and Comparative Examples, unless otherwise mentioned, allyl methacrylate and 1,3-butanediol dimethacrylate were used together in a ratio of 1:2.

Example 2

To control the swelling index, the ratio of the cross-linkers charged in each stage was changed while the total amount of allyl methacrylate and 1,3-butanediol dimethacrylate charged during stages 1 to 3 was kept equal to that in Example 1. Other than that, the polymerization recipe and charging method were the same as in Example 1.

Example 3

To control the swelling index, the total amount of allyl methacrylate and 1,3-butanediol dimethacrylate charged in stages 1 to 3 was doubled as compared with that of Example 1. Other than that, the polymerization recipe and charging method were the same as in Example 1.

Example 4

To control the swelling index, the ratio of the cross-linkers charged in each stage was changed while the total amount of allyl methacrylate and 1,3-butanediol dimethacrylate charged during stages 1 to 3 was kept equal to that of Example 3. Other than that, the polymerization recipe and charging method were the same as in Example 1.

Example 5

To control the swelling index, the total amount of allyl methacrylate and 1,3-butanediol dimethacrylate charged in stages 1 to 3 was tripled as compared with that of Example 1. Other than that, the polymerization recipe and charging method were the same as in Example 1.

Example 6

To control the swelling index, the ratio of the amount of the cross-linkers to the amount of monomers charged in each stage was changed while the total amount of allyl methacrylate and 1,3-butanediol dimethacrylate charged during stages 1 to 3 was kept equal to that of Example 5, and. Other than that, the polymerization recipe and charging method were the same as in Example 1.

The amounts of the cross-linkers used in the above Examples 1 to 6 are shown in Table 1 below.

Example 7

Polymerization was conducted under the same reaction conditions as in Example 1, except that allyl methacrylate (AMA) was used alone as a cross-linker.

Example 8

Polymerization was conducted under the same reaction conditions as in Example 1, except that 1,3-butanediol dimethacrylate was used alone as a cross-linker.

Comparative Examples 1–5

In Comparative Examples 1, 2, 3, 4, and 5, polymerization was conducted under the same reaction conditions as in Examples 1, 3, 5, 7, and 8, respectively, except that the ratios of the amount of cross-linkers to the amount of monomers charged in each of stages 1 to 3 of rubber polymerization are kept equal.

TABLE 1

| Category | | Total Amount | Amount of Cross-Linkers (% by weight based on the total amount of the rubber particle monomers) | | |
|---|---|---|---|---|---|
| | | | Stage 1 | Stage 2 | Stage 3 |
| Example | 1 | 0.3 | 0.03 | 0.105 | 0.165 |
| | 2 | 0.3 | 0.06 | 0.120 | 0.120 |
| | 3 | 0.6 | 0.06 | 0.210 | 0.330 |
| | 4 | 0.6 | 0.12 | 0.240 | 0.240 |
| | 5 | 0.9 | 0.09 | 0.315 | 0.495 |
| | 6 | 0.9 | 0.18 | 0.360 | 0.360 |
| | 7 | 0.3 | 0.03 | 0.105 | 0.165 |
| | 8 | 0.3 | 0.03 | 0.105 | 0.165 |
| Comparative Example | 1 | 0.3 | 0.03 | 0.135 | 0.135 |
| | 2 | 0.6 | 0.06 | 0.270 | 0.270 |
| | 3 | 0.9 | 0.09 | 0.405 | 0.405 |
| | 4 | 0.3 | 0.03 | 0.105 | 0.165 |
| | 5 | 0.3 | 0.03 | 0.105 | 0.165 |

Example 9–16

To examine the change in impact strength and swelling index according to the method of charging monomers in rubber polymerization stages 2 to 4, the pre-emulsion in each stage was charged thereto at one time, and polymerized. Examples 9, 10, 11, 12, 13, 14, 15, and 16 were carried out identically to Examples 1, 2, 3, 4, 5, 6, 7, and 8, respectively, except that the pre-emulsion in each stage was charged thereto at one time.

Comparative Examples 6–10

In Comparative Examples 6, 7, 8, 9, and 10, polymerization was conducted under the same reaction conditions as in Examples 9, 11, 13, 15, and 16, respectively, except that the ratios of the amount of cross-linkers to the amount of monomers charged in each of stages 1 to 3 of rubber polymerization were kept equal.

Experimental Examples (Determination of Swelling Index)

The polymerization results of Examples 1 to 16 and the swelling index of each polymerized latex are shown in Table 2. The swelling index of the polymerized latex was determined with dry powder obtained from the sequential process of coagulation of the latex, isolation of the wet powder and drying.

Each latex of Examples 1 to 16 was charged with deionized water to lower the solid content of the polymerized latex to 10% by weight, and then with 4 parts by weight of calcium chloride solution (10% by weight solution) at one time to coagulate. The mixture was heated to 90° C. and aged for 10 minutes, and then cooled. It was washed two or three times with deionized water to wash off water-soluble residue, and filtered to give an impact modifier. The impact modifier was dried in a FBD (Fluidized Bed Dryer) at 85° C. for two hours to yield a final impact modifier in the form of a dry powder.

The determination of the swelling index was conducted in acetone solvent, and 4 g of the impact modifier was swelled in acetone (130 g) for 50 hours. The gel portion swelled with acetone was obtained by centrifugation at 0° C. at 16,000 rpm over 2 hours, and its mass (A) was determined. Then, after the acetone was completely evaporated, the mass of the neat impact modifier gel (B) was determined and the swelling index (=A/B) was thus calculated.

(Evaluation of Physical Properties of Impact Modifier)

To evaluate the physical properties of the impact modifiers, 100 pbw of poly(vinyl chloride) (PVC; LG Chemical Product LS-100, Polymerization Index=1000), 4.0 pbw of thermal stabilizer (DLP), 0.9 pbw of Calcium-Stearate (Ca-St), 1.36 pbw of polyethylene wax (PE Wax), 1.0 pbw of a processing aid (LG Chemical Product PA-821), 5.0 pbw of $CaCO_3$, and 4.0 pbw of $TiO_2$ were charged to a mixer at room temperature and mixed at 1000 rpm while being heated at 115° C. When the temperature reached 115° C., the mixing speed was lowered to 400 rpm and the mixer was then cooled to 40° C. to complete a master batch.

7 pbw of the desired impact modifiers were respectively added to portions of the master batch, and they were then milled with a 2-roll mill at 190° C. for 7 minutes to produce 0.6 mm thick sheets. The sheets were cut into a size of 150 mm×200 mm and they were then layered onto a mold of 3 mm×170×220 mm, keeping their milling directions constant. They were pre-heated with a 190° C. hot press for 8 minutes (0.5 Kg), compressed for 4 minutes (10 Kg), and cooled for 3 minutes (10 Kg) to prepare specimens having a thickness of 3 mm.

The specimens produced above were delicately cut according to ASTM D-256 standards to provide impact notches, of which the Izod impact strengths were determined. The results of the impact strengths of the impact modifiers obtained in Examples 1 to 16 and Comparative Examples 1 to 10 are shown in Table 2 below.

TABLE 2

| Category | | Swelling Index | Izod Impact Strength (kgcm/cm) |
|---|---|---|---|
| Example | 1 | 5.8 | 38.4 |
| | 2 | 5.4 | 36.9 |
| | 3 | 4.8 | 34.2 |
| | 4 | 4.5 | 33.0 |
| | 5 | 3.9 | 30.0 |
| | 6 | 3.7 | 29.1 |
| | 7 | 5.7 | 37.5 |
| | 8 | 6.0 | 40.8 |
| | 9 | 5.9 | 40.2 |
| | 10 | 5.7 | 37.5 |
| | 11 | 5.0 | 35.3 |
| | 12 | 4.9 | 34.0 |
| | 13 | 4.0 | 30.6 |
| | 14 | 3.8 | 29.7 |
| | 15 | 5.9 | 40.4 |
| | 16 | 6.1 | 41.4 |
| Comparative Example | 1 | 3.5 | 27.5 |
| | 2 | 3.1 | 25.8 |
| | 3 | 2.8 | 24.3 |
| | 4 | 3.3 | 26.7 |
| | 5 | 3.7 | 28.5 |

TABLE 2-continued

| Category | Swelling Index | Izod Impact Strength (kgcm/cm) |
|---|---|---|
| 6 | 3.6 | 28.0 |
| 7 | 3.3 | 26.9 |
| 8 | 3.1 | 26.0 |
| 9 | 3.5 | 27.9 |
| 10 | 3.7 | 28.8 |

As shown in the above Table 2, when polymerization was conducted with a different ratio of the amount of cross-linkers to the amount of monomers charged in each stage, that is, the degree of cross-linking of rubber layers varied according to stages, the swelling index was increased and the impact strength was far superior compared with those with a uniform degree of cross-linking. Also, as the amount of cross-linkers in rubber particles decreased, the swelling index increased and the impact strength improved.

In addition, as shown in Examples 7, 8, 15, and 16 of Table 2, even when either AMA or BDMA was used alone as a cross-linker, excellent impact strength was obtained compared with the cases having the uniform degree of cross-linking. In Example 9, the pre-emulsion in polymerization stages 2 to 4 of Example 1 was charged at one time, and in Comparative Example 6 the pre-emulsion in polymerization stages 2 to 4 of Comparative Example 1 was charged at one time. That is, Example 9 and Comparative Example 6 demonstrate that varying the degree of cross-linking layer by layer in the rubber results in higher swelling indices than having uniform degree of cross-linking once the total amount of the cross-linker is constant, and the higher swelling indices lead to the superior impact strength.

Examples 17–21

Polymerization was carried out with the monomers used in rubber polymerization stages 2 and 3 and shell polymerization being changed. That is, 50% by weight of BA was replaced by different monomers in stages 2 and 3 and polymerized. Polymerization of the shell was conducted by replacing 10% by weight of MMA with different monomers. Other polymerization recipes and charging method were the same as in Example 9.

Comparative Examples 11–15

In Comparative Examples 11 to 15, polymerization was conducted under the same reaction conditions as used in Examples 17 to 21, respectively, but in order to render the degree of cross-linking uniform over the entire rubber, the ratios of the amount of cross-linkers to the amount of monomers charged in each of stages 1 to 3 of rubber polymerization were kept equal.

The polymerization results and the monomers in polymerization stages in Examples 17 to 21 and Comparative Examples 11 to 15 are summarized in Table 3.

TABLE 3

| Category | | Monomers | | Swelling Index | Izod Impact Strength (kgcm/cm) |
| --- | --- | --- | --- | --- | --- |
| | | Stages 2 & 3 | Stage 4 | | |
| Ex. | 17 | Butylacrylate | Methylmethacrylate & Butylacrylate | 5.9 | 39.4 |
| | 18 | Butylacrylate | Methylmethacrylate | 5.5 | 37.1 |
| | 19 | Butylacrylate & 2-Ethylhexylacrylate | Methylmethacrylate & Ethylacrylate | 6.0 | 41.3 |
| | 20 | Butylacrylate & 2-Ethylhexylacrylate | Methylmethacrylate & Butylacrylate | 6.2 | 41.5 |
| | 21 | Butylacrylate & 2-Ethylhexylacrylate | Methylmethacrylate | 5.8 | 40.9 |
| Comp. Ex. | 11 | Butylacrylate | Methylmethacrylate & Butylacrylate | 3.5 | 27.4 |
| | 12 | Butylacrylate | Methylmethacrylate | 3.3 | 27.0 |
| | 13 | Butylacrylate & 2-Ethylhexylacrylate | Methylmethacrylate & Ethylacrylate | 3.7 | 28.3 |
| | 14 | Butylacrylate & 2-Ethylhexylacrylate | Methylmethacrylate & Butylacrylate | 3.8 | 29.1 |
| | 15 | Butylacrylate & 2-Ethylhexylacrylate | Methylmethacrylate | 3.5 | 27.5 |

Examples 22–27

In Examples 22 to 27, except that the initiator used in the rubber polymerization stage was changed to butyl hydroperoxide (TBHP), the polymerization recipe and charging method were the same as in Examples 9 to 14, respectively.

Comparative Examples 16–21

In Comparative Examples 16 to 21, polymerization was conducted under the same reaction conditions as in Examples 22 to 27, respectively, but in order to render the degree of cross-linking uniform over the entire rubber, the ratios of the amount of cross-linkers to the amount of monomers charged in each of stages 1 to 3 of rubber polymerization were kept equal.

TABLE 4

| Category | | Swelling Index | Izod Impact Strength (kgcm/cm) |
| --- | --- | --- | --- |
| Ex. | 22 | 5.5 | 37.0 |
| | 23 | 5.2 | 36.4 |
| | 24 | 4.8 | 34.2 |
| | 25 | 4.3 | 32.3 |
| | 26 | 3.9 | 30.0 |
| | 27 | 3.8 | 29.6 |
| Comp. Ex. | 16 | 3.0 | 25.7 |
| | 17 | 2.9 | 24.9 |
| | 18 | 2.6 | 23.5 |
| | 19 | 2.4 | 22.4 |
| | 20 | 2.3 | 21.9 |
| | 21 | 2.0 | 18.8 |

As shown in Examples 22 to 27, even when TBHP was used as an initiator, the swelling indices were higher with varied degree of cross-linking in the rubber than with uniform degree of cross-linking throughout the entire rubber cores once the total amount of the cross-linker was constant, and the higher swelling indices led to the superior impact strength. (Comparative Examples 16 to 21).

Examples 28–33

Examples 28 to 33 show polymerization wherein the rubber polymerization is conducted by two stages including seed polymerization. The amount of the cross-linkers charged in each rubber polymerization stage is summarized in Table 5. The polymerization recipe and charging method were the same as in Examples 2, 4, 6, 10, 12, and 14, respectively.

Comparative Examples 22–27

In Comparative Examples 22 to 27, polymerization was conducted under the same reaction conditions as in Examples 28 to 33, respectively, but in order to render the degree of cross-linking uniform over the entire rubber, the ratios of the amount of cross-linkers to the amount of monomers charged in each stage of rubber polymerization were kept equal.

The Izod impact strength of the impact modifiers prepared in the above Examples 28–33 and Comparative Examples 22–27 are shown in Table 5 below.

TABLE 5

| Category | | Amount of Cross-linkers (% by weight based on the total amount of the rubber particle monomers) | | | Swelling Index | Izod Impact Strength (kgcm/cm) |
| --- | --- | --- | --- | --- | --- | --- |
| | | Total Amount | Stage 1 | Stage 2 | | |
| Ex. | 28 | 0.3 | 0.06 | 0.24 | 5.1 | 35.6 |
| | 29 | 0.6 | 0.12 | 0.48 | 4.1 | 31.2 |
| | 30 | 0.9 | 0.18 | 0.06 | 3.4 | 27.2 |
| | 31 | 0.3 | 0.06 | 0.24 | 5.2 | 36.0 |
| | 32 | 0.6 | 0.12 | 0.48 | 4.3 | 32.8 |
| | 33 | 0.9 | 0.18 | 0.72 | 3.6 | 28.1 |
| Comp. Ex. | 22 | 0.3 | 0.03 | 0.27 | 3.2 | 26.5 |
| | 23 | 0.6 | 0.06 | 0.54 | 2.8 | 24.0 |
| | 24 | 0.9 | 0.09 | 0.81 | 2.5 | 23.0 |
| | 25 | 0.3 | 0.03 | 0.27 | 3.3 | 26.5 |
| | 26 | 0.6 | 0.06 | 0.54 | 3.0 | 25.6 |
| | 27 | 0.9 | 0.09 | 0.81 | 2.7 | 23.9 |

As shown in Table 5, even when the rubber polymerization of two stages rather than three stages was conducted, as the degree of cross-linking was varied in each rubber layer the higher swelling indices were obtained, which led to far superior impact strength of the impact modifier to those having the uniform degree of cross-linking throughout the entire rubber particle cores (Comparative Examples 22 to 27). The same relationship among the degree of cross-linking, swelling index, and impact strength applied to the cases with increased total amount of cross-linker. In conclusion, the swelling index of rubber particles was controlled by conducting multi-stage rubber polymerization so that the degree of cross-linking of the core rubber including the seed has at least two values, which thereby enables preparation of impact modifier with improved impact strength as compared with impact modifiers comprising the rubber particles having a uniform degree of cross-linking over the entire rubber.

The acrylic impact modifier imparting excellent impact resistance was invented by employing multi-stage polymerization in which the swelling index of rubber particles was controlled by changing the degree of cross-linking from stage to stage. The poly(vinyl chloride) comprising the impact modifier of the present invention has good weatherability as well as excellent impact strength.

What is claimed is:

1. An acrylic impact modifier composition for poly(vinyl chloride), wherein the acrylic impact modifier composition comprises:
   (a) a rubber core containing alkyl acrylate polymers comprising (i) a seed layer and (ii) at least two core layers, wherein the seed layer and each core layer is cross-linked, wherein the cross-linking densities of the seed layer and the core layers are different from each other, and wherein each core layer has a different cross-linking density; and
   (b) a shell containing alkyl metbactylate polymers.

2. The acrylic impact modifier composition as claimed in claim 1, wherein the rubber core of (a) comprises at least three layers having different cross-linking densities, formed by rendering each layer to contain a different amount of a cross-linker, the amounts selected from within the range of 0.1 to 5.0 parts by weight based on 100 parts by weight of the total monomers present In the acrylic impact modifier composition.

3. The acrylic impact modifier composition as claimed In claim 1, wherein monomers in the rubber core of (a) comprise 70 to 95 parts by weight and monomers in the shell of (b) comprise 5 to 30 parts by weight based on 100 parts by weight of total monomers present in the acrylic impact modifier composition.

4. The acrylic impact modifier composition as claimed in claim 1, wherein the alkyl acrylate polymers in the rubber core of (a) comprise one or more monomers selected from the group consisting of, ethyl acrylate, propyl acrylate, isopropyl acrylate, butyl acrylate, hexyl acrylate, octyl acrylate, and 2-ethyl hexyl acrylate, a homopolymer of these monomers, or a copolymer polymerized with one or more monomers selected from the group of monomers mentioned above.

5. The acrylic impact modifier composition as claimed in claim 1, wherein the shell of (b) comprises an alicyl methacrylate having 1 to 4 carbon atoms in the alkyl group.

6. The acrylic impact modifier composition as claimed in claim 1. wherein the alkyl methactylate in said shell is a monomer selected from the group consisting of ethyl methacrylate, methyl metbacrylate, and butyl methacrylate.

7. The acrylic impact modifier composition as claimed in claim 1, wherein the alkyl methactylate in said shell is a copolymer of an alkyl metbacrylate and an alkyl acrylale that is one or more monomers selected from the group consisting of ethyl acrylate, methyl acrylate, and butyl acrylate.

8. The acrylic impact modifier composition is claimed in claim 1, wherein said shell comprises an auxiliary monomer, which Is one or more monomers selected from the group consisting of ethyl acrylate, methyl acrylate, butyl acrylate, acrylonitrile, and methacrylonitrile, in an amount of 0.1 to 10% by weight of the total of the shell monomers.

9. A poly(vinyl chloride) composition comprising
   (a) 80 to 99 parts by weight of poly (vinyl chloride); and
   (b) 1 to 20 parts by weight of the acrylic impact modifier of claim 1.

10. The acrylic impact modifier composition as claimed in claim 1, comprising:
    a seed layer prepared from the blend mixture comprising:
        97.0 to 99.9 parts by weight of alkyl acrylate having $C_2$–$C_8$ in the alkyl group;
        0.1 to 3.0 parts by weight of cross-linker;
        0.1 to 3.0 parts by weight ol polymerization initiator;
        0.1 to 4.0 parts by weight of emulsifier; and
        1000 parts by weight of deionized water;
    a first core layer prepared from the blend mixture comprising:
        97.0 to 99.9 parts by weight of alkyl acryiste having $C_2$–$C_8$ in the alkyl group;
        0.1 to 3.0 parts by weight of cross-linker;
        0.1 to 4.0 parts by weight of emulsifier; and
        80 parts by weight of deionized water;
    a second core layer prepared from the blend mixture comprising:
        97.0 to 99.9 parts by weight of alkyl acrylate having $C_2$–$C_8$ in the alkyl group;
        0.1 to 3.0 parts by weight of cross-linker;
        0.1 to 4.0 parts by weight of emulsifier; and
        80 parts by weight of deionized water; and
    a shell prepared from the blend mixture comprising:
        90 to 100 parts by weight of elkyl methacrylate having $C_1$–$C_4$ in the alkyl group;
        10 part by weight or less of alkyl acrylate selected from the group
        consisting of ethyl acrylate, methyl acrylate and butyl acrylate;
        0.1 to 4.0 parts by weight of emulsifier; and
        150 parts by weight of deionized water.

* * * * *